US011176096B2

(12) United States Patent
Ito et al.

(10) Patent No.: US 11,176,096 B2
(45) Date of Patent: Nov. 16, 2021

(54) FILE SYSTEM FOR GENOMIC DATA

(71) Applicant: INTERNATIONAL BUSINESS MACHINES CORPORATION, Armonk, NY (US)

(72) Inventors: Megumi Ito, Kanagawa-Ken (JP); Yasushi Negishi, Tokyo (JP); Takeshi Ogasawara, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 968 days.

(21) Appl. No.: 14/833,960

(22) Filed: Aug. 24, 2015

(65) Prior Publication Data
US 2017/0060896 A1   Mar. 2, 2017

(51) Int. Cl.
G06F 16/174   (2019.01)
G06F 16/178   (2019.01)

(52) U.S. Cl.
CPC ...... G06F 16/1744 (2019.01); G06F 16/1794 (2019.01)

(58) Field of Classification Search
CPC ............... G06F 17/30153; G06F 17/30179
USPC ........................................................ 707/692
See application file for complete search history.

(56) References Cited

U.S. PATENT DOCUMENTS

| 5,313,616 | A   | * | 5/1994  | Cline ................. G06F 11/3612 713/323 |
| 5,892,900 | A   | * | 4/1999  | Ginter .................... G06F 21/10 726/26 |
| 8,140,843 | B2  | * | 3/2012  | Holtzman ............. H04L 9/3228 707/687 |
| 8,812,243 | B2  |   | 8/2014  | Cardonha et al. |
| 2005/0033777 | A1 | * | 2/2005 | Moraes .................. G06F 16/27 |
| 2006/0041840 | A1 | * | 2/2006 | Blair .................. G06Q 10/0875 715/249 |
| 2008/0243752 | A1 | * | 10/2008 | Gormish ................. G06F 16/93 |
| 2009/0204650 | A1 | * | 8/2009 | Wong ............... G06F 17/30153 |
| 2012/0151177 | A1 | * | 6/2012 | Kalach .................. G06F 3/0608 711/203 |
| 2012/0185859 | A1 | * | 7/2012 | Kashiwaya ......... G06F 9/30076 718/100 |
| 2013/0132353 | A1 |   | 5/2013 | Mande et al. |
| 2013/0185267 | A1 |   | 7/2013 | Gatewood et al. |

(Continued)

OTHER PUBLICATIONS

Bhola et al., "No. Reference Compression of Genomic Data Stored In FASTQ Format," 2011 IEEE International Conference on Bioinformatics and Biomedicine, Nov. 12-15, 2011, pp. 147-150, Atlanta, GA.

Primary Examiner — James Trujillo
Assistant Examiner — Kurt A Mueller
(74) Attorney, Agent, or Firm — Tutunjian & Bitetto, P.C.; Randall Bluestone

(57) ABSTRACT

Methods and systems for managing data redundancy include registering certified commands, input files, output files, and arguments in an execution history list after execution of said certified commands. An existing output file is provided in response to execution of a first certified command that matches an entry in the execution history list. A file is deleted if the file is reproducible from another file using a second certified command. The deleted file is registered in a reproducible file list. The deleted file is reproduced upon request using the second certified command.

14 Claims, 6 Drawing Sheets

(56) References Cited

U.S. PATENT DOCUMENTS

| | | |
|---|---|---|
| 2013/0246460 A1 | 9/2013 | Maltbie et al. |
| 2013/0339297 A1* | 12/2013 | Chen ................ G06F 17/30581 |
| | | 707/624 |
| 2014/0129529 A1 | 5/2014 | Akelbein et al. |
| 2015/0006475 A1* | 1/2015 | Guo ................ G06F 17/30159 |
| | | 707/609 |
| 2015/0199241 A1* | 7/2015 | Zhuang ................ G06F 16/178 |
| | | 707/692 |

\* cited by examiner

FILE SYSTEM FOR GENOMIC DATA

BACKGROUND

Technical Field

The present invention relates to file systems and, more particularly, to file systems for managing multiple copies and formats of large volumes of compressed data.

Description of the Related Art

Genomic data is generated in very large quantities by modern gene sequencing techniques. In addition, there are multiple formats in use today, each of which has its own advantages and disadvantages. As a result, some applications maintain multiple copies of gene data in varying formats, resulting in substantial waste of storage resources.

One exemplary pipeline for genomic data may begin with raw data being output from a sequencer in a FASTQ format. FASTQ is a format that represents raw genome data as a text file with corresponding quality scores. The size of a typical FASTQ output file may be about 200 GB to about 600 GB, which can then be compressed using standard tools such as gzip to about 80 GB to about 200 GB. The analysis of a genome and production of a FASTQ file can take days.

The FASTQ information is then mapped to a reference genome in either SAM or BAM format. BAM is more highly compressed than SAM and conversion between the two demands relatively little processing power. For example, the SAM format version of the example FASTQ file described above would have a file size of about 200 GB to about 600 GB, while a BAM version of the same file would have a file size of about 50 GB to about 150 GB. The SAM format therefore need not be saved in storage, as it can be converted directly from the more highly compressed BAM format as needed.

Another format, CRAM, is more highly compressed than BAM, but the conversion between BAM/SAM and CRAM is significantly more involved. Thus, while the CRAM version of the above described file would have a size of about 20 GB to about 80 GB, the large conversion time needed to render the CRAM file into SAM or BAM can be an obstruction for some applications. While accelerators for performing some of these conversions exist, they are not always appropriate for the more demanding conversions.

SUMMARY

A method for managing data redundancy includes registering certified commands, input files, output files, and arguments in an execution history list after execution of said certified commands. An existing output file is provided in response to execution of a first certified command that matches an entry in the execution history list. A file is deleted if the file is reproducible from another file using a second certified command. The deleted file is registered in a reproducible file list. The deleted file is reproduced upon request using the second certified command executed by a processor.

A system for data management includes an execution history list comprising registered certified commands that have been previously executed with associated input files, output files, and arguments. A reproducible file list includes information identifying deleted files that may be reproduced using a second certified command. A processor is configured to register an executed first certified command in the execution history list, to provide an existing output file in response to execution of the first certified command that matches an entry in the execution history list, to delete a file if the file is reproducible from another file, to register deleted files in the reproducible file list, and to reproduce the deleted file upon request using the second certified command These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present invention transparently reduce duplication of data that is saved in multiple formats. The present embodiments use certified commands, which are defined as commands that guarantee the generation of identical output files when given identical input, to identify stored data that may be reused when responding to a request. Any command satisfying that condition can be used as a certified command without modification—no special functions are needed.

Users register certified commands, along with the commands' respective input/output file information and arguments, with a file system. The input information includes all relevant environment variables, input file names, execution files, and libraries needed to reproduce the output of the command. In one example, if the certified command is in Java, the entire runtime system, including libraries used, is recorded. The files to be registered can also be automatically registered by the file system by recording file accesses during command execution. Input and output files, meanwhile, are registered as patterns such as, e.g., regular expressions. If there is a command that can produce its input file from its output files, users can register the command to the file system as a certified reverse command. One example of such a command would be a lossless compression utility.

To use a purely illustrative example, consider the following command: java -jar cramtools.jar cram -R ref.fa -I input.bam -O output.cram -n -Q --capture-all-tags. In this case, the certified command would be registered as "java -jar cramtools.jar cram", while input file information might be stored as, "{-R % I1, -I % I2, -O % O1, -n -Q, --capture-all-tags}", where the { } brackets indicate that the arguments are not executed in any particular order, "% I1" and "% I2" indicate input file names, and "% O1" indicates an output file name.

Users can also register a certified compare command, to determine the difference between two inputs, and a certified patch command, to apply the difference to an output. In this way, the system can store the output of a certified command in its entirety once, with subsequent changes to the input being represented and stored as differences from the output of the certified command.

Figure 1:
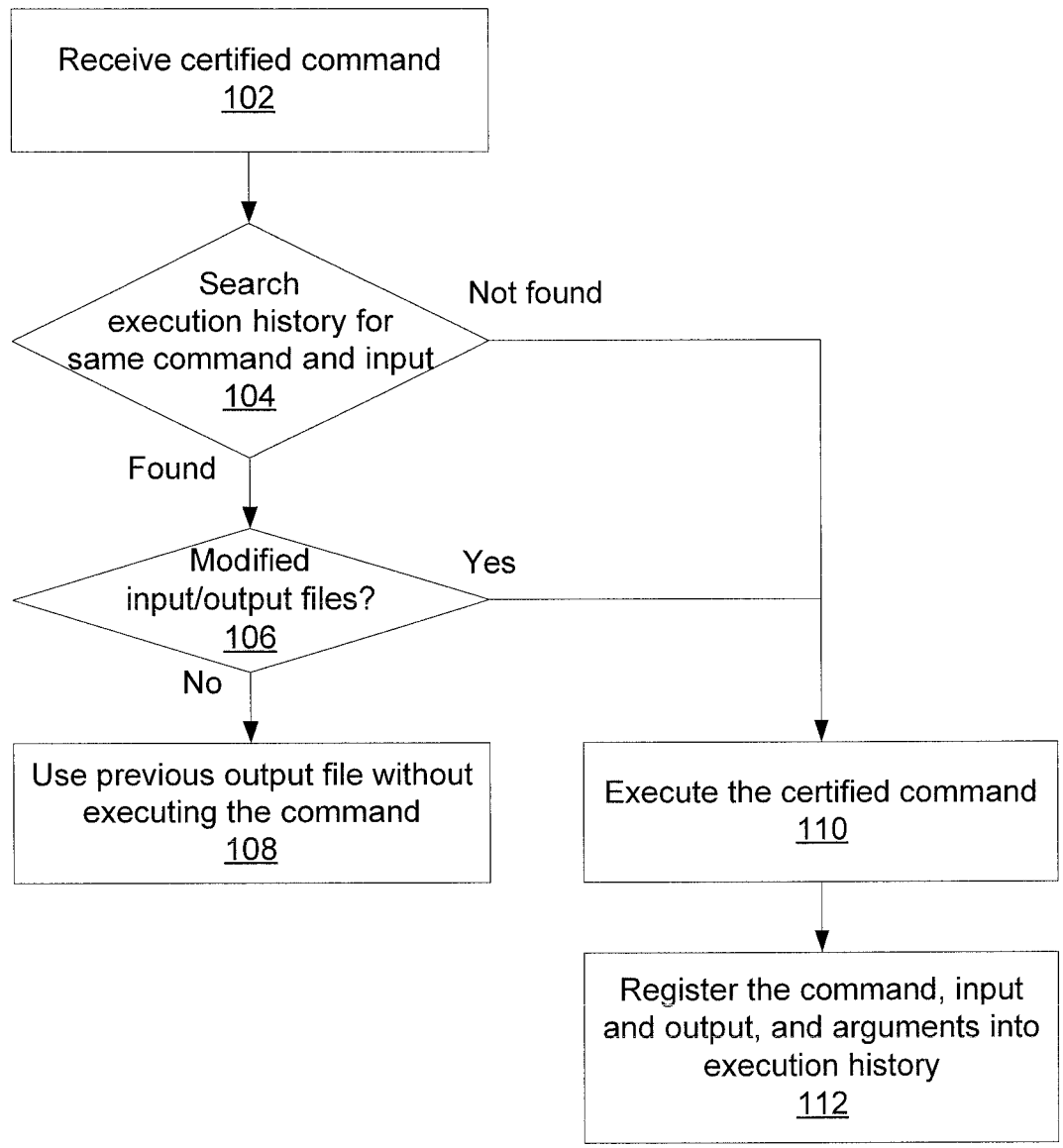
FIG. 1 is a block/flow diagram of a method for executing certified commands in accordance with the present principles.

Referring now to the drawings in which like numerals represent the same or similar elements and initially to FIG. 1, a method for performing a certified command is shown. Block 102 receives the certified command. In one example, the certified command represents conversion of an input file in a first format to an output file in a second format, such as a conversion from BAM to CRAM or other lossless compression. Such a conversion may be very time consuming. Block 104 therefore searches through an execution history list to determine if the certified command has previously been run on the input file(s). If an entry in the list is found for the certified command and the input file(s), block 106 determines whether those input files have been modified. Such modification may include addition of new information, deletion of information, or replacement of information.

If the input and output is the same as in a previous execution of the certified command, block 108 uses the previously stored output file without executing the certified command. Because the certified command guarantees an identical output to an identical input, there is no need to repeat the execution. The output file may be shared by copy-on-write, with a pointer to the previously stored data being provided as the output, such that requesting software accesses the same output as was originally generated.

If the command or input was not found, or if the input had been modified since the previous execution, block 110 executes the certified command as requested. Block 112 then registers the command, the input and output, and any arguments to the command in the execution history list.

Figure 2:
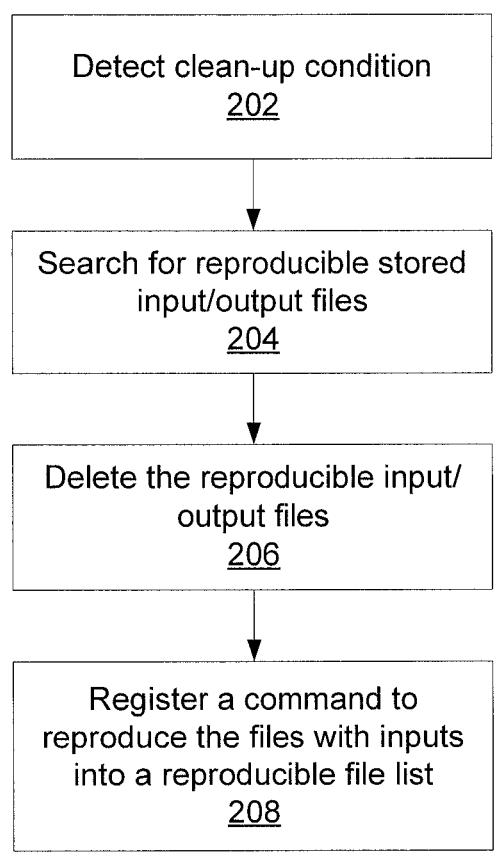
FIG. 2 is a block/flow diagram of a method for deleting redundant files that may be reproduced in accordance with the present principles.

Referring now to FIG. 2, a method of file system cleanup is shown. As the method of FIG. 1 is executed over time, and as new commands and inputs are provided, it is contemplated that the system will eventually run low on storage space or become idle. Block 202 detects a cleanup condition, for example when the system exceeds a threshold memory usage percentage or when processor utilization drops below a threshold utilization percentage. Block 204 then searches the file system for reproducible input and output files that have been stored. For example after conversion to a losslessly compressed format, it may be prudent to delete the uncompressed input file, which will be much larger. Given a certified reverse command, the uncompressed input file can be perfectly reproduced from the output file. Block 204 preferentially searches for large files, where removing redundancy will provide the most benefit. Block 206 therefore deletes the reproducible file(s) and block 208 registers a command to reproduce the file(s) in a reproducible file list.

Figure 3:
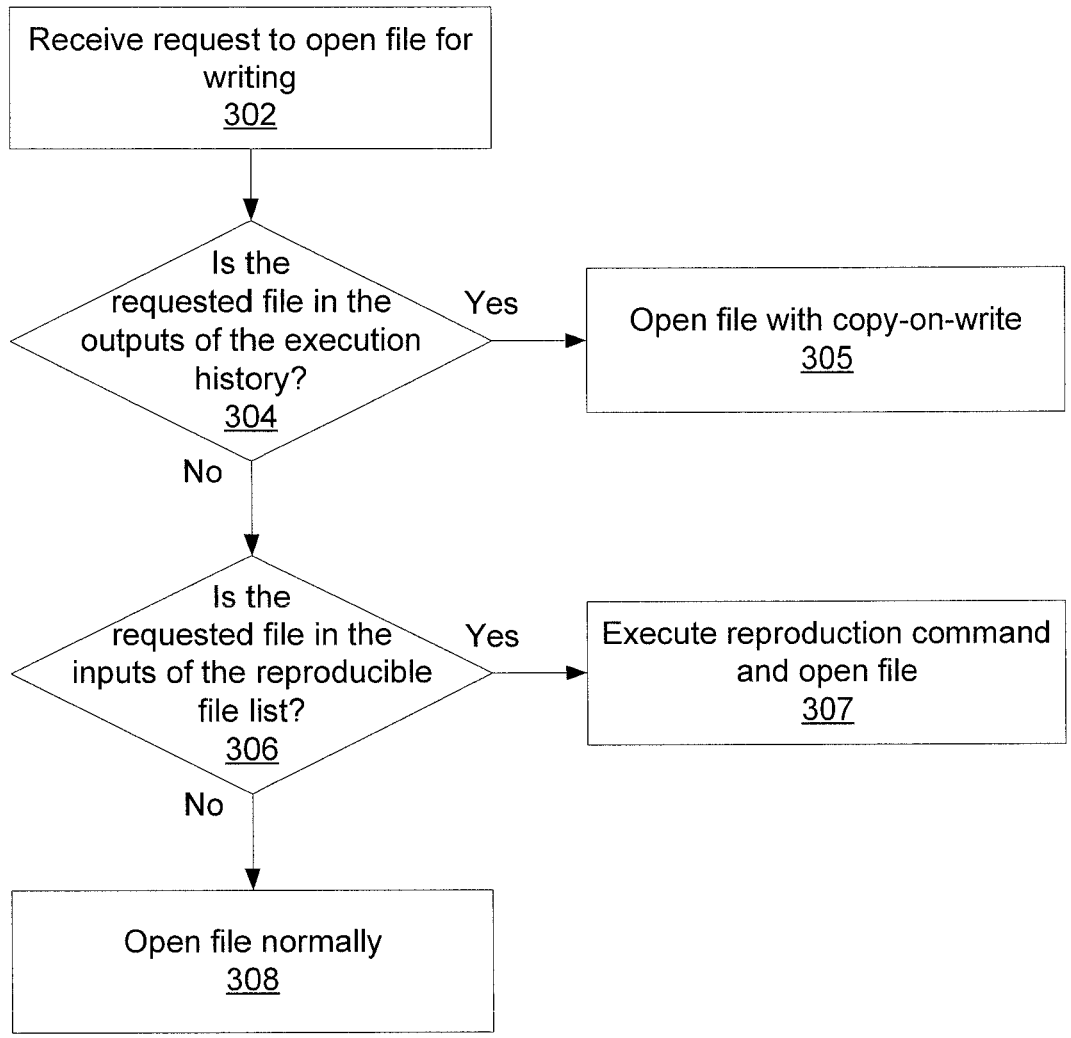
FIG. 3 is a block/flow diagram of a method for opening a file for writing in accordance with the present principles.

Referring now to FIG. 3, a method for opening a file for writing is shown. Block 302 receives a request to open the file for writing. Block 304 then determines whether the requested file is among the outputs stored in the execution history list. If so, block 305 opens the file with copy-on-write, such that any changes to the previously stored output file will prompt a new copy of the output being written or will instead prompt the generation of a difference between the output and the modified file, such that the entire file need not be reproduced to capture minor changes.

If the requested file is not among the outputs recorded in the execution history list, block 306 determines whether the requested file is among the deleted files in the reproducible file list. If so, block 307 executes the command associated with reproducing the deleted file and opens the file. Both the before and after versions of the reproduced file are stored, with changes to the original file being stored as a difference. If the requested file is in neither list, block 308 opens the file normally.

Figure 4:
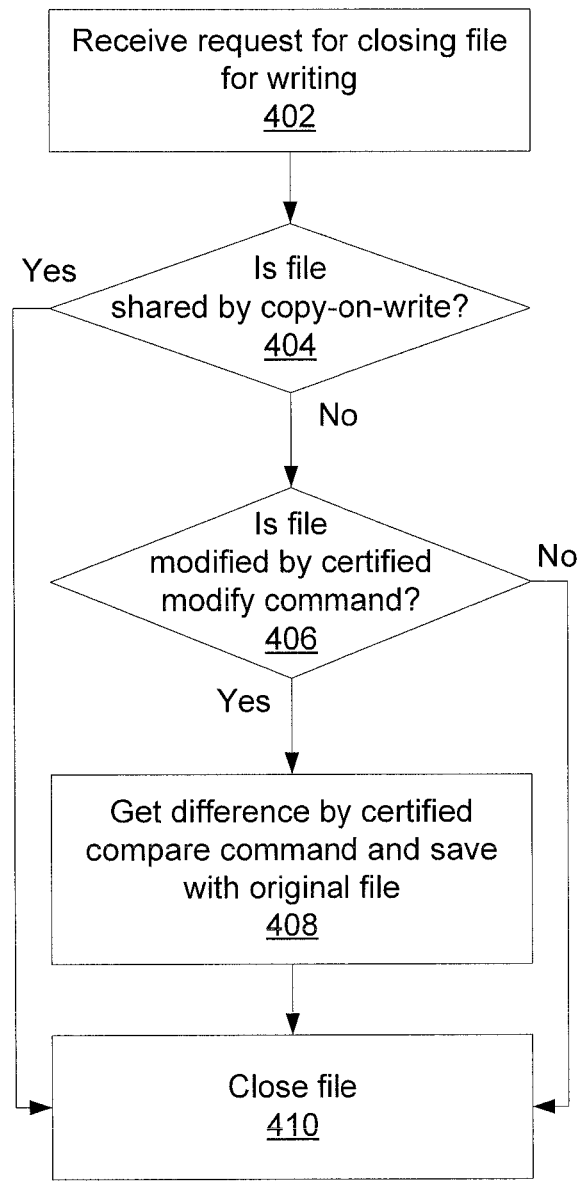
FIG. 4 is a block/flow diagram of a method for closing a file for writing in accordance with the present principles.

Referring now to FIG. 4, a method for closing a file that is open for writing is shown. Block 402 receives the request to close the file that was previously opened for writing. Block 404 determines whether the file was shared by copy-on-write. If so, block 410 closes the file, as any write will have been performed on a separate copy of the file in question. If not, block 406 determines whether the file was modified by a certified command.

If the file was not modified by a certified modify command, such that the file is closed in block 410. If a certified command was used to modify the file, then block 408 determines the difference using a certified compare command and saves the difference with the original file. In one example, if a command to modify a BAM file's header is used, the certified compare command can be used to determine the difference between the file versions. Optionally the original file itself may be modified using, e.g., a certified patch command. Block 410 then closes the file.

Figure 5:
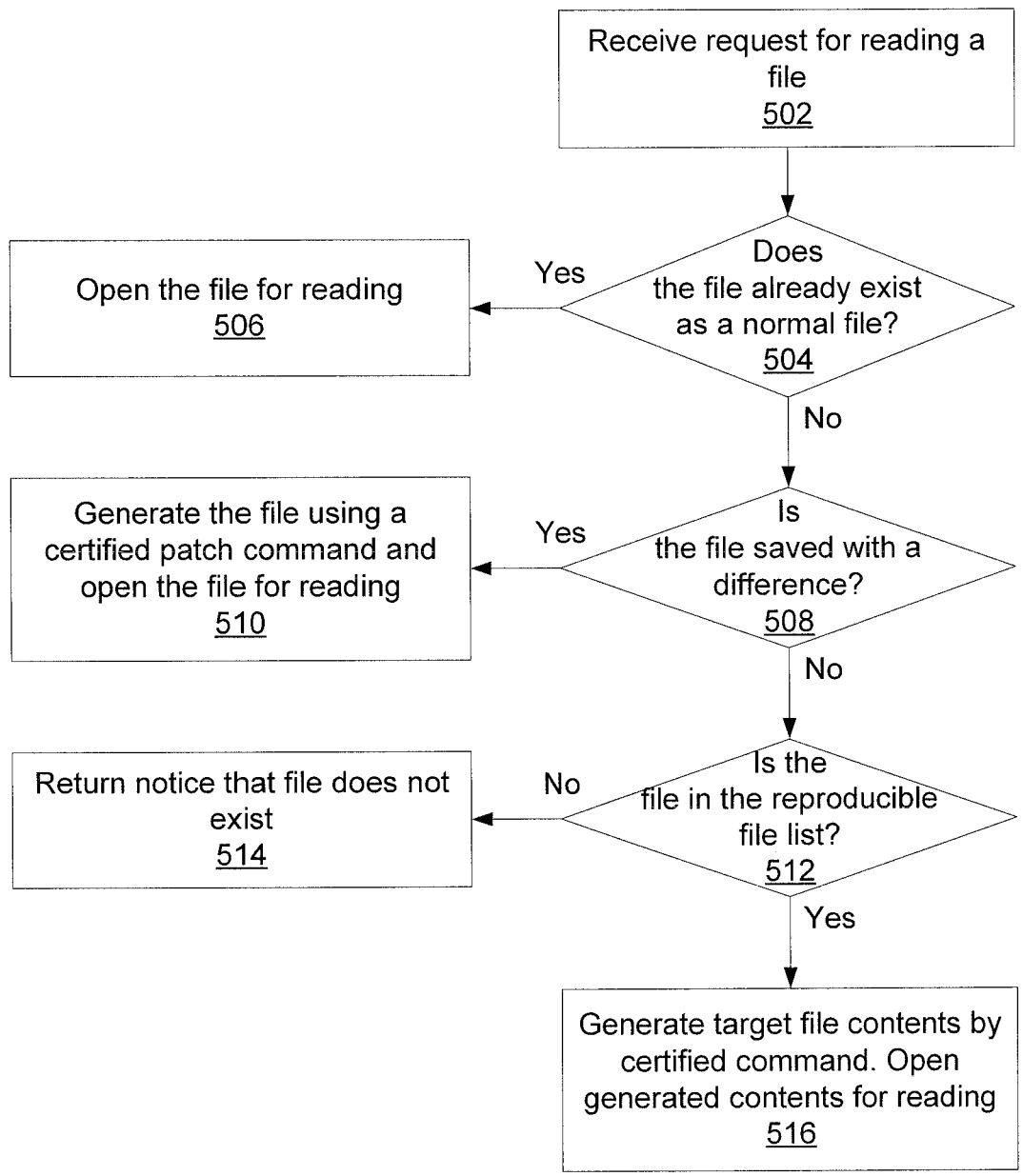
FIG. 5 is a block/flow diagram of a method for reading a file in accordance with the present principles.

Referring now to FIG. 5, a method for opening a file for reading is shown. Block 502 receives a request for reading a file. Block 504 determines whether the file already exists in a readable form, e.g. if the file is stored as a normal file on the file system. If so, block 506 opens the file for reading. If not, block 508 determines whether a version of the file exists with a saved difference that matches the request. If so, block 510 generates the requested file using a certified patch command to bring the file into conformity with the desired output and opens the file for reading.

If the file is not saved with a difference, block 512 determines whether the file is in the reproducible file list. If not, block 514 returns a notice that the file does not exist, as it is not available in any form. If the file is in the reproducible file list, however, block 516 generates the target file contents by executing a certified command to recreate the file. For example, if the file was compressed and the original file was deleted, block 516 may decompress the compressed file. Block 516 then opens the regenerated contents for reading.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 6:
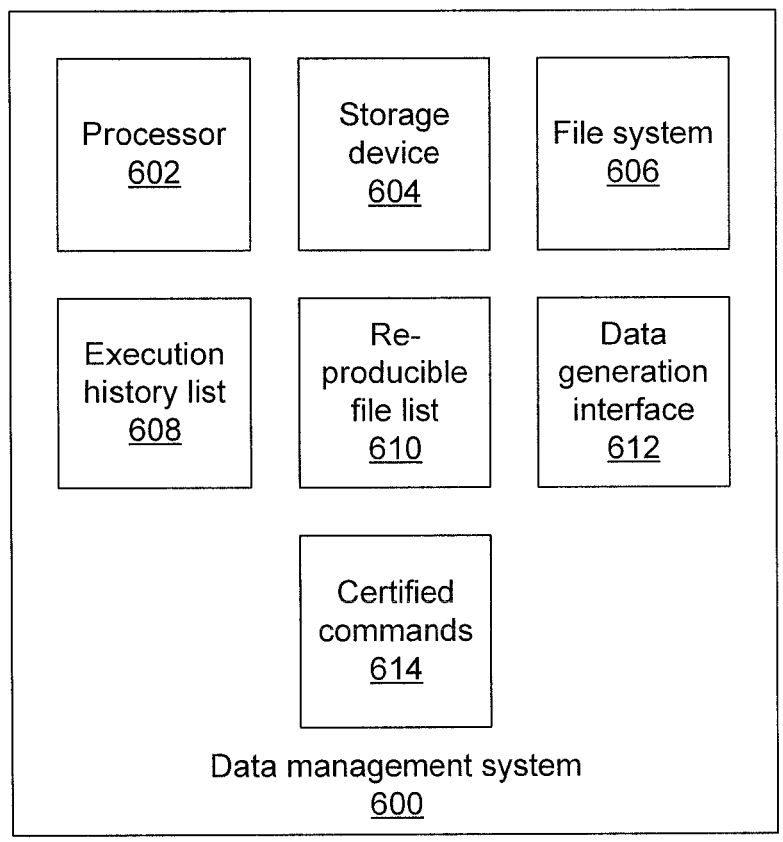
FIG. 6 is a data management system in accordance with the present principles.

Referring now to FIG. 6, a system 600 for data management is shown. The system 600 includes a processor 602 and a storage device 604. A file system 606 runs on the storage device 604 to manage files stored on the storage device 604. The file system 606 in particular includes an execution history list 608 and a reproducible file list 610. A data generation interface 612 receives data from other devices, such as for example a genome sequencer, and stores the data with the file system 606. A list of certified commands 614 provide access to the data stored in the file system 606 and perform functions such as conversion between different file formats.

Having described preferred embodiments of a file system for genomic data (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for managing data redundancy, comprising:
registering certified commands, input files, output files, libraries, and arguments in an execution history list stored in a separate file from the output files after execution of said certified commands, wherein each certified command converts input files in a first file format to output files in a second file format;
searching the execution history list for a first certified command responsive to a request for the first certified command;
outputting an existing registered output file in response to the request for the first certified command based on an entry in the execution history list, without executing the certified command;
deleting a first file, wherein the first file is reproducible from a second file using a second certified command, and wherein deleting the first file comprises searching for the second file in the execution history list and for a corresponding certified reverse command that will reproduce the deleted first file based on the second file, to use as the second certified command;
registering the deleted first file in a reproducible file list;
searching the reproducible file list responsive to a request for the deleted first file; and
reproducing the deleted first file upon request using the second certified command executed by a processor.

2. The method of claim 1, wherein the certified command is a lossless compression utility.

3. The method of claim 1, further comprising:
generating a difference between an original file and a modified file; and
saving the difference as a separate file with the original file.

4. The method of claim 3, further comprising applying the difference to the original file using a certified patch command responsive to the modified file being requested.

5. The method of claim 1, further comprising opening a requested file with copy-on-write responsive to a determination that the requested file is among outputs stored in the execution history list.

6. The method of claim 1, wherein the input files and the output files encode genomic data.

7. The method of claim 6, wherein the first file format and the second file format are selected from the group consisting of BAM, SAM, CRAM, FASTQ, and compressed FASTQ.

8. The method of claim 7, wherein the input files and the output files have respective file sizes between 20 GB and 600 GB.

9. A computer readable storage medium comprising a computer readable program for managing data redundancy, wherein the computer readable program when executed on a computer causes the computer to perform the steps of:
registering certified commands, input files, output files, libraries, and arguments in an execution history list stored in a separate file from the output files after execution of said certified commands, wherein each certified command converts input files in a first file format to output files in a second file format;
searching the execution history list for a first certified command responsive to a request for the first certified command;
outputting an existing registered output file in response to the request for the first certified command based on an entry in the execution history list, without executing the certified command;
deleting a first file, wherein the first file is reproducible from a second file using a second certified command, and wherein deleting the first file comprises searching for the second file in the execution history list and for a corresponding certified reverse command that will reproduce the deleted first file based on the second file, to use as the second certified command;
registering the deleted first file in a reproducible file list;
searching the reproducible file list responsive to a request for the deleted first file; and
reproducing the deleted first file upon request using the second certified command executed by a processor.

10. A system for data management, comprising:
an execution history list comprising registered certified commands that have been previously executed with associated input files, output files, libraries, and arguments, stored in a separate file from the output files, wherein each certified command converts input files in a first file format to output files in a second file format; and
a processor configured to register an executed first certified command in the execution history list, to search the execution history for a first certified command responsive to a request for the first certified command, to output an existing registered output file in response to the request for the first certified command based on an entry in the execution history list, without executing the certified command, to delete a first file, wherein the first file is reproducible from a second file using a second certified command, to search for the second file in the execution history list and for a corresponding certified reverse command that will reproduce the deleted first file based on the second file, to use as the second certified command, to register the deleted first file in a reproducible file list, to search the reproducible file list responsive to a request for the deleted first file, and to reproduce the deleted file upon request using the second certified command.

11. The system of claim 10, wherein the certified command is a lossless compression utility.

12. The system of claim 10, wherein the processor is further configured to generate a difference between an original file and a modified file and to save the difference as a separate file with the original file.

13. The system of claim 12, wherein the processor is further configured to apply the difference to the original file using a certified patch command when the modified file is requested.

14. The system of claim 10, wherein the processor is further configured to open a requested file with copy-on-write if the requested file is among outputs stored in the execution history list.

\* \* \* \* \*